US012577044B2

(12) United States Patent (10) Patent No.: US 12,577,044 B2

Johnson et al. (45) Date of Patent: Mar. 17, 2026

(54) MULTIDIRECTIONAL ROBOTIC SHELF RESTOCKING SYSTEM

(71) Applicant: Toshiba Global Commerce Solutions, Inc., Durham, NC (US)

(72) Inventors: Brad M. Johnson, Raleigh, NC (US); John Pistone, Cary, NC (US); James Frank, Montreal (CA)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 471 days.

(21) Appl. No.: 18/116,402

(22) Filed: Mar. 2, 2023

(65) Prior Publication Data

US 2024/0294328 A1 Sep. 5, 2024

(51) Int. Cl.
| *B65G 1/04* | (2006.01) |
| *A47F 1/12* | (2006.01) |
| *B25J 11/00* | (2006.01) |

(52) U.S. Cl.
CPC ............ *B65G 1/0435* (2013.01); *A47F 1/125* (2013.01); *B25J 11/00* (2013.01)

(58) Field of Classification Search
CPC ........... B65G 1/0435; A47F 1/125; B25J 1/00
See application file for complete search history.

(56) References Cited

U.S. PATENT DOCUMENTS

| 10,737,817 | B2 | 8/2020 | Rogers |
| 12,014,321 | B2 * | 6/2024 | Rongley ............ G06Q 30/0255 |

| 12,111,632 | B1 * | 10/2024 | Bansal ............... G05B 19/4155 |
| 2015/0098775 | A1 | 4/2015 | Razumov |
| 2018/0086489 | A1 * | 3/2018 | Rogers ................ B25J 15/0616 |
| 2019/0033837 | A1 | 1/2019 | Zanger |
| 2024/0002153 | A1 * | 1/2024 | Menon ................ B65G 1/0492 |
| 2024/0025647 | A1 * | 1/2024 | Paulson .............. B65G 1/1376 |

OTHER PUBLICATIONS

Unknown, Robots Tasked With Restocking Retailers' Shelves, Jan. 28, 2019, PYMNTS (available at https://www.pymnts.com/news/retail/2019/robots-restocking-retailers-inventory/).

Ciment, Shoshy, Walmart is bringing robots to 650 more stores as the retailer ramps up automation in stores nationwide, Jan. 13, 2020, Business Insider (available at https://www.businessinsider.com/walmart-adding-robots-help-stock-shelves-to-650-more-stores-2020-1).

* cited by examiner

*Primary Examiner* — Joseph C Rodriguez
(74) *Attorney, Agent, or Firm* — Kaufman & Canoles, P.C.

(57) ABSTRACT

Systems and methods of multidirectional robotic shelf restocking are performed. In one exemplary embodiment, a multidirectional robotic shelf restocking apparatus is configured to operate in first and second adjoining regions. The first region being above or below the second region defined by opposing stocked shelf structures. The apparatus includes a vertical motion mechanism and a corresponding vertical motion drive operable to move the vertical motion mechanism in a vertical direction. Further, the apparatus includes an arm member and a corresponding rotational motion drive operable to rotate the arm member between the stocked shelf structures and a corresponding linear motion drive operable to linearly extend and retract the arm member. In addition, the apparatus includes an end effector coupled to the arm member and configured to transfer an item from the first region to the second region by the motion of the vertical motion mechanism and the arm member.

18 Claims, 9 Drawing Sheets

100e 123a
147a
125
129
130
127
147b 121
126
145       128

138
137
132

131
133
143
141

153       151
155

123b

111a

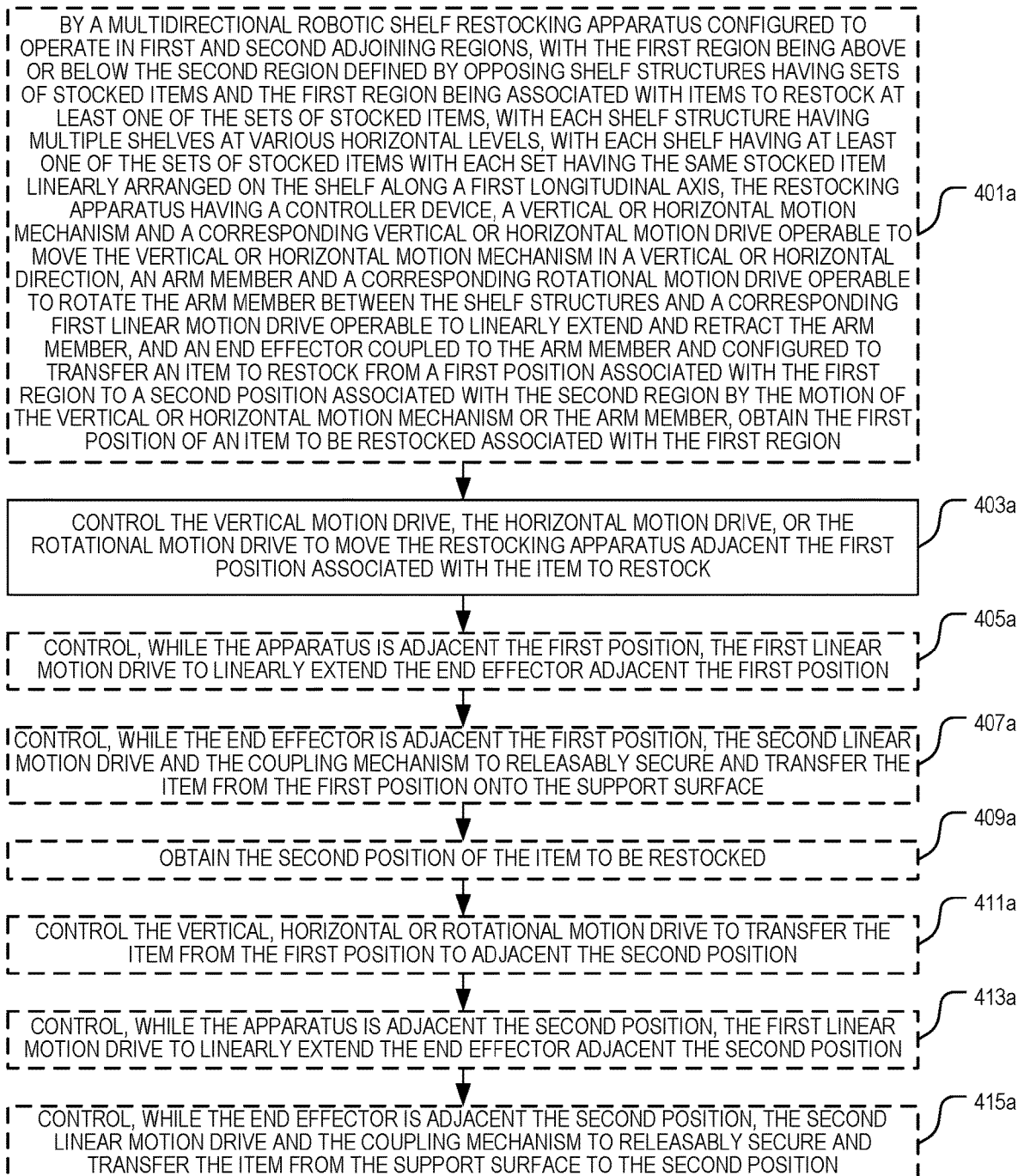

400a

BY A MULTIDIRECTIONAL ROBOTIC SHELF RESTOCKING APPARATUS CONFIGURED TO OPERATE IN FIRST AND SECOND ADJOINING REGIONS, WITH THE FIRST REGION BEING ABOVE OR BELOW THE SECOND REGION DEFINED BY OPPOSING SHELF STRUCTURES HAVING SETS OF STOCKED ITEMS AND THE FIRST REGION BEING ASSOCIATED WITH ITEMS TO RESTOCK AT LEAST ONE OF THE SETS OF STOCKED ITEMS, WITH EACH SHELF STRUCTURE HAVING MULTIPLE SHELVES AT VARIOUS HORIZONTAL LEVELS, WITH EACH SHELF HAVING AT LEAST ONE OF THE SETS OF STOCKED ITEMS WITH EACH SET HAVING THE SAME STOCKED ITEM LINEARLY ARRANGED ON THE SHELF ALONG A FIRST LONGITUDINAL AXIS, THE RESTOCKING APPARATUS HAVING A CONTROLLER DEVICE, A VERTICAL OR HORIZONTAL MOTION MECHANISM AND A CORRESPONDING VERTICAL OR HORIZONTAL MOTION DRIVE OPERABLE TO MOVE THE VERTICAL OR HORIZONTAL MOTION MECHANISM IN A VERTICAL OR HORIZONTAL DIRECTION, AN ARM MEMBER AND A CORRESPONDING ROTATIONAL MOTION DRIVE OPERABLE TO ROTATE THE ARM MEMBER BETWEEN THE SHELF STRUCTURES AND A CORRESPONDING FIRST LINEAR MOTION DRIVE OPERABLE TO LINEARLY EXTEND AND RETRACT THE ARM MEMBER, AND AN END EFFECTOR COUPLED TO THE ARM MEMBER AND CONFIGURED TO TRANSFER AN ITEM TO RESTOCK FROM A FIRST POSITION ASSOCIATED WITH THE FIRST REGION TO A SECOND POSITION ASSOCIATED WITH THE SECOND REGION BY THE MOTION OF THE VERTICAL OR HORIZONTAL MOTION MECHANISM OR THE ARM MEMBER, OBTAIN THE FIRST POSITION OF AN ITEM TO BE RESTOCKED ASSOCIATED WITH THE FIRST REGION    401a

CONTROL THE VERTICAL MOTION DRIVE, THE HORIZONTAL MOTION DRIVE, OR THE ROTATIONAL MOTION DRIVE TO MOVE THE RESTOCKING APPARATUS ADJACENT THE FIRST POSITION ASSOCIATED WITH THE ITEM TO RESTOCK    403a

CONTROL, WHILE THE APPARATUS IS ADJACENT THE FIRST POSITION, THE FIRST LINEAR MOTION DRIVE TO LINEARLY EXTEND THE END EFFECTOR ADJACENT THE FIRST POSITION    405a

CONTROL, WHILE THE END EFFECTOR IS ADJACENT THE FIRST POSITION, THE SECOND LINEAR MOTION DRIVE AND THE COUPLING MECHANISM TO RELEASABLY SECURE AND TRANSFER THE ITEM FROM THE FIRST POSITION ONTO THE SUPPORT SURFACE    407a

OBTAIN THE SECOND POSITION OF THE ITEM TO BE RESTOCKED    409a

CONTROL THE VERTICAL, HORIZONTAL OR ROTATIONAL MOTION DRIVE TO TRANSFER THE ITEM FROM THE FIRST POSITION TO ADJACENT THE SECOND POSITION    411a

CONTROL, WHILE THE APPARATUS IS ADJACENT THE SECOND POSITION, THE FIRST LINEAR MOTION DRIVE TO LINEARLY EXTEND THE END EFFECTOR ADJACENT THE SECOND POSITION    413a

CONTROL, WHILE THE END EFFECTOR IS ADJACENT THE SECOND POSITION, THE SECOND LINEAR MOTION DRIVE AND THE COUPLING MECHANISM TO RELEASABLY SECURE AND TRANSFER THE ITEM FROM THE SUPPORT SURFACE TO THE SECOND POSITION    415a

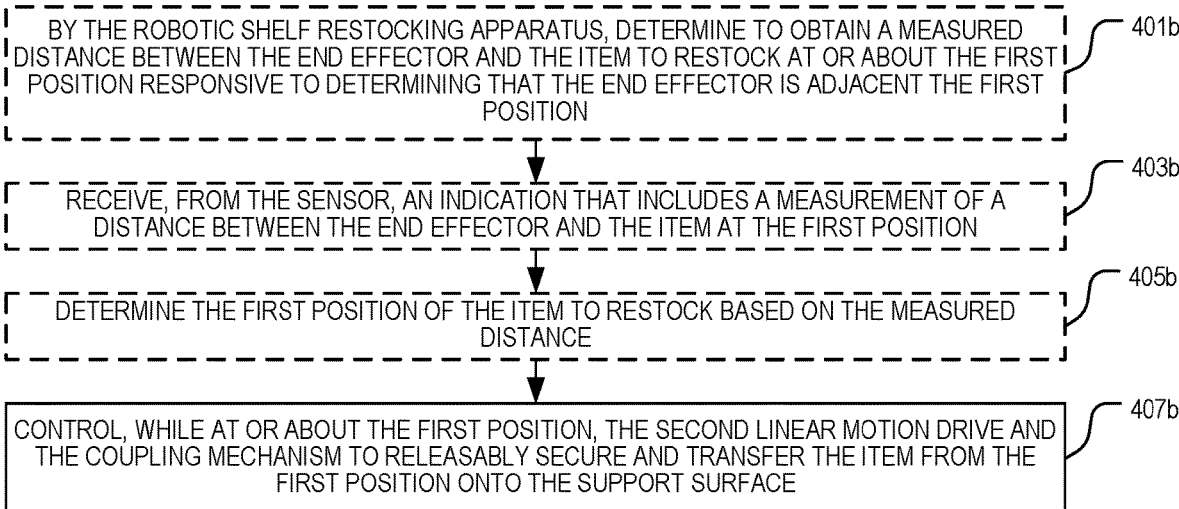

BY THE ROBOTIC SHELF RESTOCKING APPARATUS, DETERMINE TO OBTAIN A MEASURED DISTANCE BETWEEN THE END EFFECTOR AND THE ITEM TO RESTOCK AT OR ABOUT THE FIRST POSITION RESPONSIVE TO DETERMINING THAT THE END EFFECTOR IS ADJACENT THE FIRST POSITION — 401b

RECEIVE, FROM THE SENSOR, AN INDICATION THAT INCLUDES A MEASUREMENT OF A DISTANCE BETWEEN THE END EFFECTOR AND THE ITEM AT THE FIRST POSITION — 403b

DETERMINE THE FIRST POSITION OF THE ITEM TO RESTOCK BASED ON THE MEASURED DISTANCE — 405b

CONTROL, WHILE AT OR ABOUT THE FIRST POSITION, THE SECOND LINEAR MOTION DRIVE AND THE COUPLING MECHANISM TO RELEASABLY SECURE AND TRANSFER THE ITEM FROM THE FIRST POSITION ONTO THE SUPPORT SURFACE — 407b

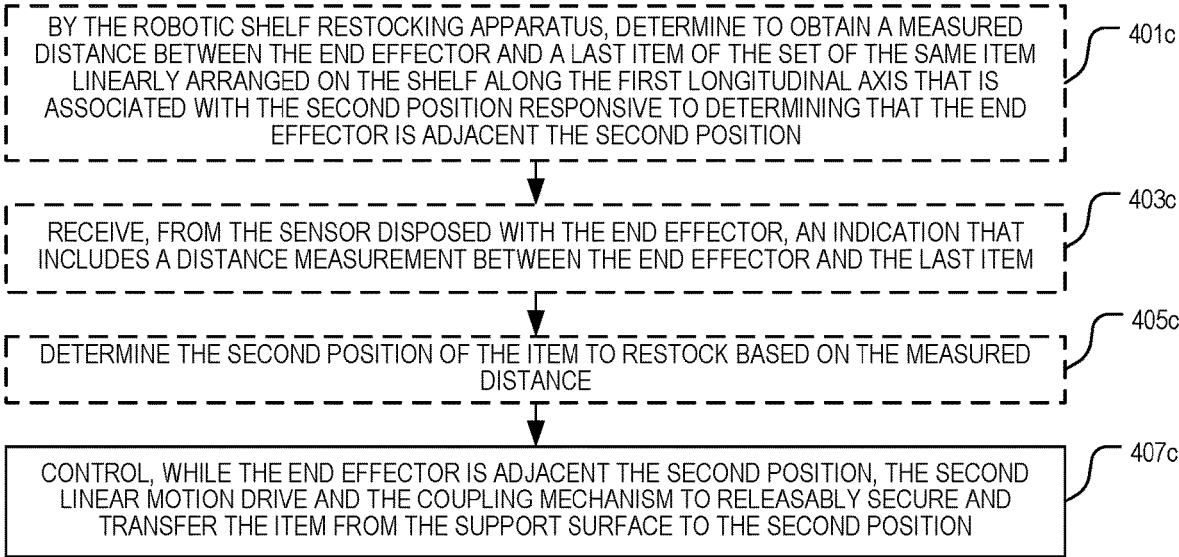

BY THE ROBOTIC SHELF RESTOCKING APPARATUS, DETERMINE TO OBTAIN A MEASURED DISTANCE BETWEEN THE END EFFECTOR AND A LAST ITEM OF THE SET OF THE SAME ITEM LINEARLY ARRANGED ON THE SHELF ALONG THE FIRST LONGITUDINAL AXIS THAT IS ASSOCIATED WITH THE SECOND POSITION RESPONSIVE TO DETERMINING THAT THE END EFFECTOR IS ADJACENT THE SECOND POSITION — 401c

RECEIVE, FROM THE SENSOR DISPOSED WITH THE END EFFECTOR, AN INDICATION THAT INCLUDES A DISTANCE MEASUREMENT BETWEEN THE END EFFECTOR AND THE LAST ITEM — 403c

DETERMINE THE SECOND POSITION OF THE ITEM TO RESTOCK BASED ON THE MEASURED DISTANCE — 405c

CONTROL, WHILE THE END EFFECTOR IS ADJACENT THE SECOND POSITION, THE SECOND LINEAR MOTION DRIVE AND THE COUPLING MECHANISM TO RELEASABLY SECURE AND TRANSFER THE ITEM FROM THE SUPPORT SURFACE TO THE SECOND POSITION — 407c

FIG. 4C

MULTIDIRECTIONAL ROBOTIC SHELF RESTOCKING SYSTEM

BACKGROUND

Conventional retail shelf systems are commonly configured by retailers to form shelf configurations that allow consumers to browse products on both sides of the aisle. However, conventional retail stores require many employees and thus can be costly to operate. Also, conventional retail shelf systems require constant inventory management by retail employees further adding to the operating costs. It is well known that the most expensive place to hold merchandise is on a retail shelf due to the resources required to support that merchandise such as storage costs and labor costs. Due to the limited shelf space of retail stores, the variety of goods offered on retail shelves is restricted, with restocking being frequently required to maintain stocked goods on the shelves especially for high-demand goods. In addition, restocking of goods on retail shelves interferes with the consumer's ability to select items from the retail shelves. Further, any delay in restocking items can result in lost revenues for retailers.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-C illustrate embodiments of a method performed by a multidirectional robotic shelf restocking system of shelf restocking in accordance with various aspects as described herein.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Retailers typically stock many of the same items on store shelves due to the challenges of real-time restocking of those items, resulting in fewer items being available on the shelves. Further, retail stores are typically arranged based on the way the retailer prefers consumers to shop and not necessarily to improve consumers' shopping efficiency. In addition, restocking by retail store employees interferes with the consumers' ability to select items from the store shelves. Accordingly, there is a need for methods and techniques to provide real-time restocking of retail shelves without interfering with consumers' shopping experience. In one exemplary embodiment, a restocking robot is operable to obtain items to be restocked from a floor level below or above the retail shelves and then restock those obtained items from the back of the shelves without any interference to consumers' shopping experience.

Figure 1A:
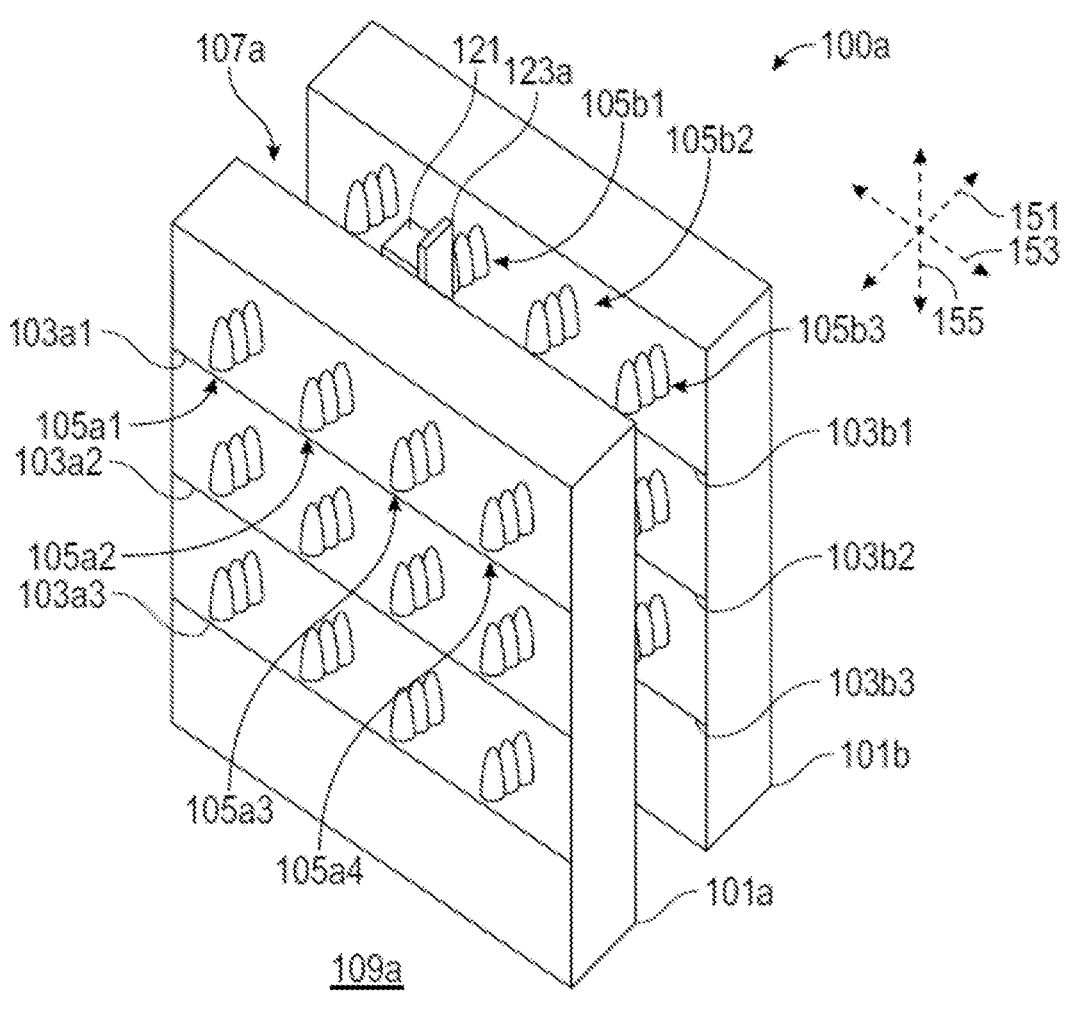
FIGS. 1A-B illustrate perspective and top views of one embodiment of a system of multidirectional robotic shelf restocking in accordance with various aspects as described herein.
Figure 1B:
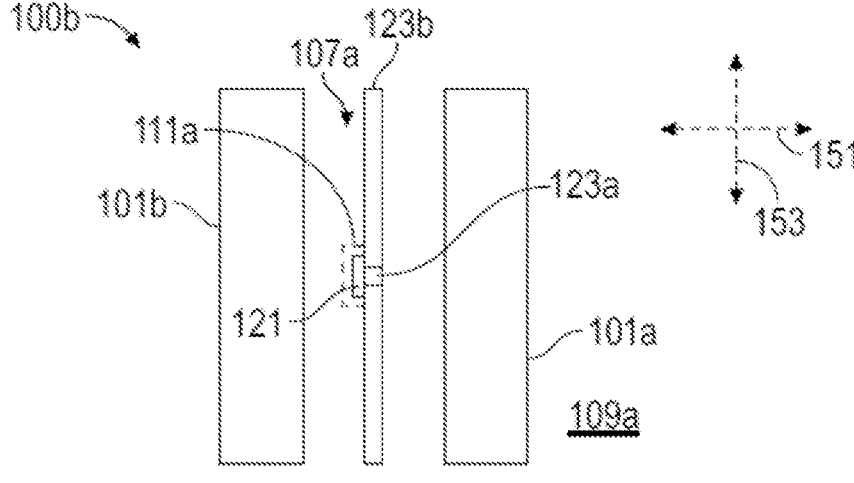

Furthermore, the exemplary embodiments described herein include improved techniques and methods to enable multidirectional robotic shelf restocking. For example, FIGS. 1A-B illustrate perspective and top views of one embodiment of a system 100a,b of multidirectional robotic shelf restocking in accordance with various aspects as described herein. In FIGS. 1A-B, the system 100a,b can include a surface 109a (e.g., retail floor surface) having opposing stocked shelf structures 101a,b (e.g., retail shelves) disposed thereon. In one example, the backs of the stocked shelf structures 101a,b are opposing with a region 107a formed between the backs of the stocked shelf structures 101a,b. In another example, each stocked shelf structure 101a,b is an open shelf. Each stocked shelf structure 101a-b can have multiple shelves 103a1-3, 103b1-3 at various horizontal levels. Further, each shelf 103a1-3, 103b1-3 can have sets of restock items (collectively represented such as by 105a1-4, 105b1-3) with each set of the same stocked item (individually represented such as by 105a1, 105b1) being linearly arranged on that shelf 103a1, 103b1 along a first horizontal axis 151 that is normal to the plane formed by each of the front/back of the opposing stocked shelf structures 101a,b. A multidirectional robotic shelf restocking apparatus 121 can be configured to operate in the region 107a defined by the opposing stocked shelf structures 101a-b to be restocked. Further, the restocking apparatus 121 can be operable to operate in the region 107a defined by the opposing stocked shelf structures 101a-b along a second horizontal axis 153 that is perpendicular to the first horizontal axis 151. Further, the restocking apparatus 121 can be configured to operate in the region 107a along a vertical axis 155. In one example, the restocking apparatus 121 can horizontally or vertically move along a vertical track or rail 123a or a horizontal track or rail 123b positioned in the region 107a. In addition, a first aperture 111a can be disposed in the surface 109a (e.g., a retail floor surface) and configured to enable the apparatus 121 to enter an adjoining region (e.g., a lower restocking floor) adjoined below the region 107a. Alternatively or additionally, an aperture (not shown) can be disposed in a second surface (e.g., an upper restocking floor surface) adjoined above the region 107a and configured to enable the apparatus 121 to enter a second adjoining region (e.g., an upper restocking floor). Each adjoining region can be associated with items to restock one or more of the sets of stocked items in the stocked shelf structures 101a,b.

Figure 1C:
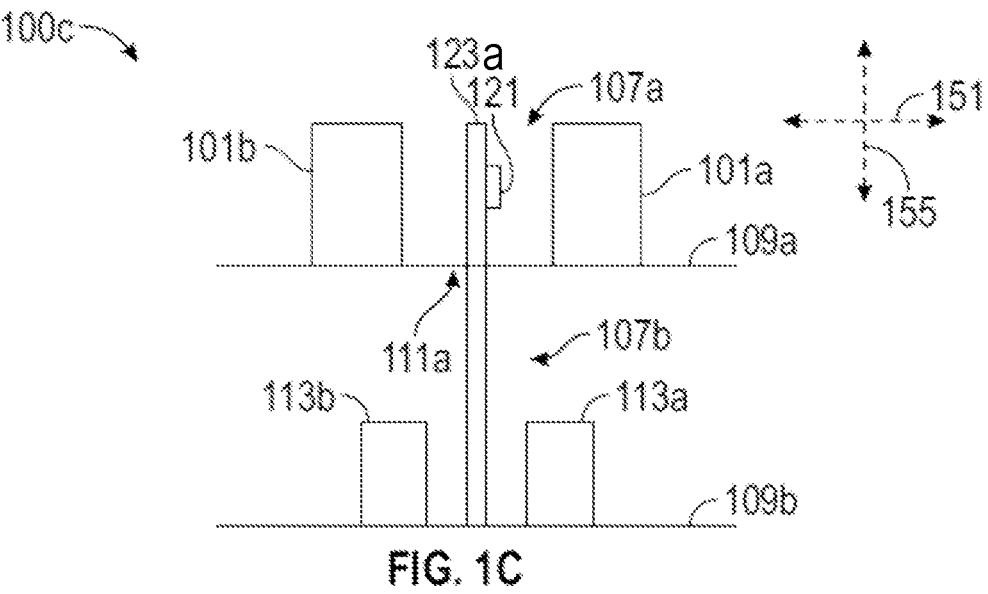
FIGS. 1C-D illustrate side views of other embodiments of a system of multidirectional robotic shelf restocking in accordance with various aspects as described herein.
Figure 1D:
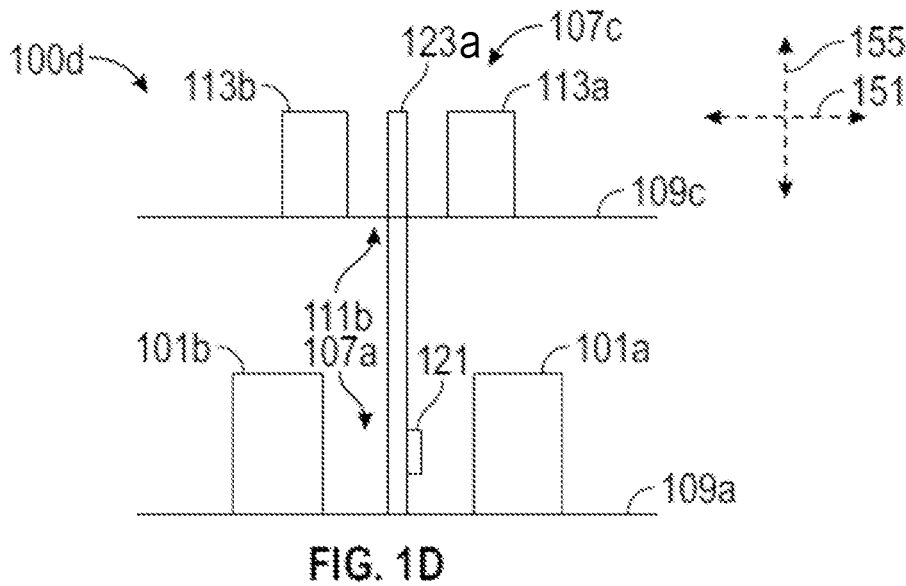

FIGS. 1C-D illustrate side views of other embodiments of a system 100c-d of multidirectional robotic shelf restocking in accordance with various aspects as described herein. In FIG. 1C, the restocking apparatus 121 can be operable to move through the aperture 111a disposed in the surface 109a (e.g., retail floor) such as by the vertical track or rail 123a to access a region 107b adjoined below the region 107a so as to obtain an item to be restocked from one or more restocking structures 113a,b (e.g., shelves) positioned on the surface 109b (e.g., lower restocking floor). In one example, the restocking structures 113a,b can replicate the same configuration of the opposing stocked shelf structures 101a, b, including having the same sets of various items 105a-f arranged at the same positions on the shelves of the restocking structures 113a,b. By doing so the restocking apparatus 121 is operable to restock all or a portion of the sets of various items 105a-f arranged on the shelves 105a-f of the opposing stocked shelf structures 103a-b. In another example, the restocking structures 113a,b can be configured to include one or more of the sets of various items 105a-f to be restocked that are arranged on the one or more restocking structures 113a,b. In FIG. 1D, the restocking apparatus 121 can be operable to move through the aperture 111b disposed in the surface 109b (e.g., retail floor) such as by the vertical track or rail 123a to access a region 107c adjoined above the region 107a so as to obtain an item to be restocked from one or more restocking structures 113a,b (e.g., shelves) positioned on the surface 109c (e.g., upper restocking floor).

Figure 1E:
FIGS. 1E-F illustrate perspective and side views of another embodiment of a system of multidirectional robotic shelf restocking in accordance with various aspects as described herein.
Figure 1F:
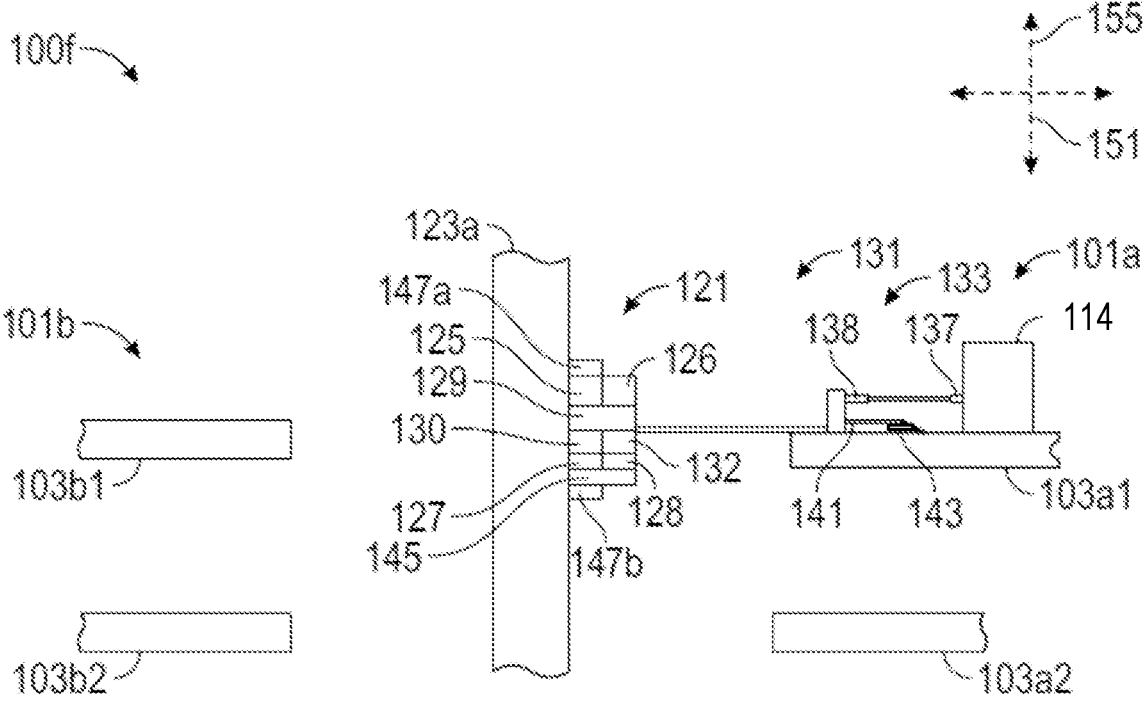

FIGS. 1E-F illustrate perspective and side views of another embodiment of a system 100e,f of multidirectional robotic shelf restocking in accordance with various aspects as described herein. In FIGS. 1E-F, the restocking apparatus 121 can include a vertical motion mechanism 125 and corresponding vertical motion drive 126 operable to move the restocking apparatus 121 vertically along the vertical axis 155. Further, the restocking apparatus 121 can include a horizontal motion mechanism 127 and corresponding horizontal motion drive 128 operable to move the restocking apparatus 121 horizontally along the second longitudinal axis 153. The restocking apparatus 121 can also include an arm member 131 and a corresponding first linear motion drive 132 operable to linearly extend and retract the arm member 131. In addition, the restocking apparatus 121 can include a rotational motion drive mechanism 129 and a corresponding rotational motion drive 130 operable to rotate the arm member 131 between the stocked shelf structures 101a,b along a horizontal plane represented by the axes 151 and 153. One or more guide structures 147a,b can moveably or slidably couple the restocking apparatus 121 to a track or rail 123 represented by a vertical track or rail 123a or a horizontal track or rail 123b.

In FIGS. 1E-F, the arm member 131 can be configured to include an end effector 133, a support surface 141, and a sensor 143. The end effector 133 can be configured to transfer an item from a first position to a second position by the motion of the vertical motion mechanism 125, the horizontal motion drive mechanism 127, the rotational motion mechanism 129, and the arm member 131. The end effector 133 can include a coupling mechanism 137 and a corresponding second linear motion drive 138 operable to linearly extend and retract the coupling mechanism 137. The coupling mechanism 137 can be operable to releasably secure an item. The support surface 141 can be configured to support an item during the transfer of that item from a first position to a second position. The sensor 143 can be disposed in a front portion of the support surface 141 and can be operable to sense a distance between the end effector 133 and an obstacle. The sensor 143 can be a contact sensor (e.g., proximity sensor) or a non-contact sensor (e.g., laser sensor). The restocking apparatus 121 can also include a controller device 145 operable to control the vertical motion drive 126, the horizontal motion drive 128, or the rotational motion drive 130 to move the restocking apparatus 121 adjacent the first and second positions. Further, the controller device 145 can be operable to control the first or second linear drive 132, 138, or the coupling mechanism 137 to releasably secure and transfer an item between the first and second positions. Further, an open end of the support surface 141 can be tapered so that an item can more easily move on or off the support surface 141. The controller device 145 can be configured to include processing circuitry and a memory.

In operation, the controller 145 can obtain a first position specific to a position of an item to restock associated with the region 109b,c. Further, the controller 145 can control the vertical motion drive 126, the horizontal motion drive 128, the rotational motion drive 130, or the first linear motion drive 132 to move the restocking apparatus 121 adjacent (e.g., horizontally adjacent) a first position specific to an item to restock 114 such as positioned in or on the restocking structure 113a,b in the region 107b,c. While the restocking apparatus 121 is adjacent the first position such as adjacent the restocking structure 113a,b having the item the restock 114 positioned therein or thereon, the controller 145 can control the first linear motion drive 132 to linearly extend the end effector 133 adjacent the first position associated with the item to restock based on the sensor 143 (e.g., proximity sensor). While the end effector 133 is adjacent the first position, the controller 145 can control the second linear motion drive 138 to linearly extend the coupling mechanism 137 so as to releasably couple the coupling mechanism 137 to the item to restock 114. The controller 145 can then control the second linear motion drive 138 to linearly retract the coupling mechanism 137 so as to releasably secure and transfer the item the restock 114 onto the support surface 141.

Furthermore, the controller 145 can obtain the second position of the item to restock 114 associated with the region 109a. The controller 145 can control the vertical, horizontal, rotational, or first linear motion drive 126, 128, 130, 132 to transfer the item to restock 114 from the first position to adjacent the second position. While the restocking apparatus 121 is adjacent the second position, the controller 145 can control the second linear motion drive 138 to linearly extend the coupling mechanism 137 so as to releasably couple the coupling mechanism 137 to the item to restock 114. The controller 145 can then control the second linear motion drive 138 to linearly extend the coupling mechanism 137 so as to releasably secure and transfer the item to restock 114 from the support surface 141 to the second position on the shelf 103a1.

Figure 2:
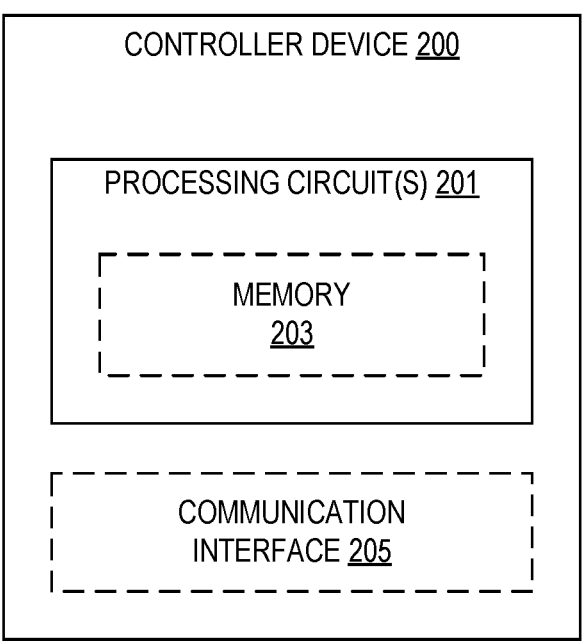
FIG. 2 illustrates one embodiment of a controller device of a multidirectional robotic shelf restocking system in accordance with various aspects as described herein.

FIG. 2 illustrates one embodiment of a controller device 200 of a multidirectional robotic shelf restocking apparatus in accordance with various aspects as described herein. As shown, the device 200 includes processing circuitry 201 and communication circuitry 205. The communication circuitry 205 is configured to transmit and/or receive information to and/or from one or more other nodes (e.g., via any communication technology). The processing circuitry 201 is configured to perform processing described above, such as by executing instructions stored in memory 203. The processing circuitry 201 in this regard may implement certain functional means, units, or modules.

Figure 3:
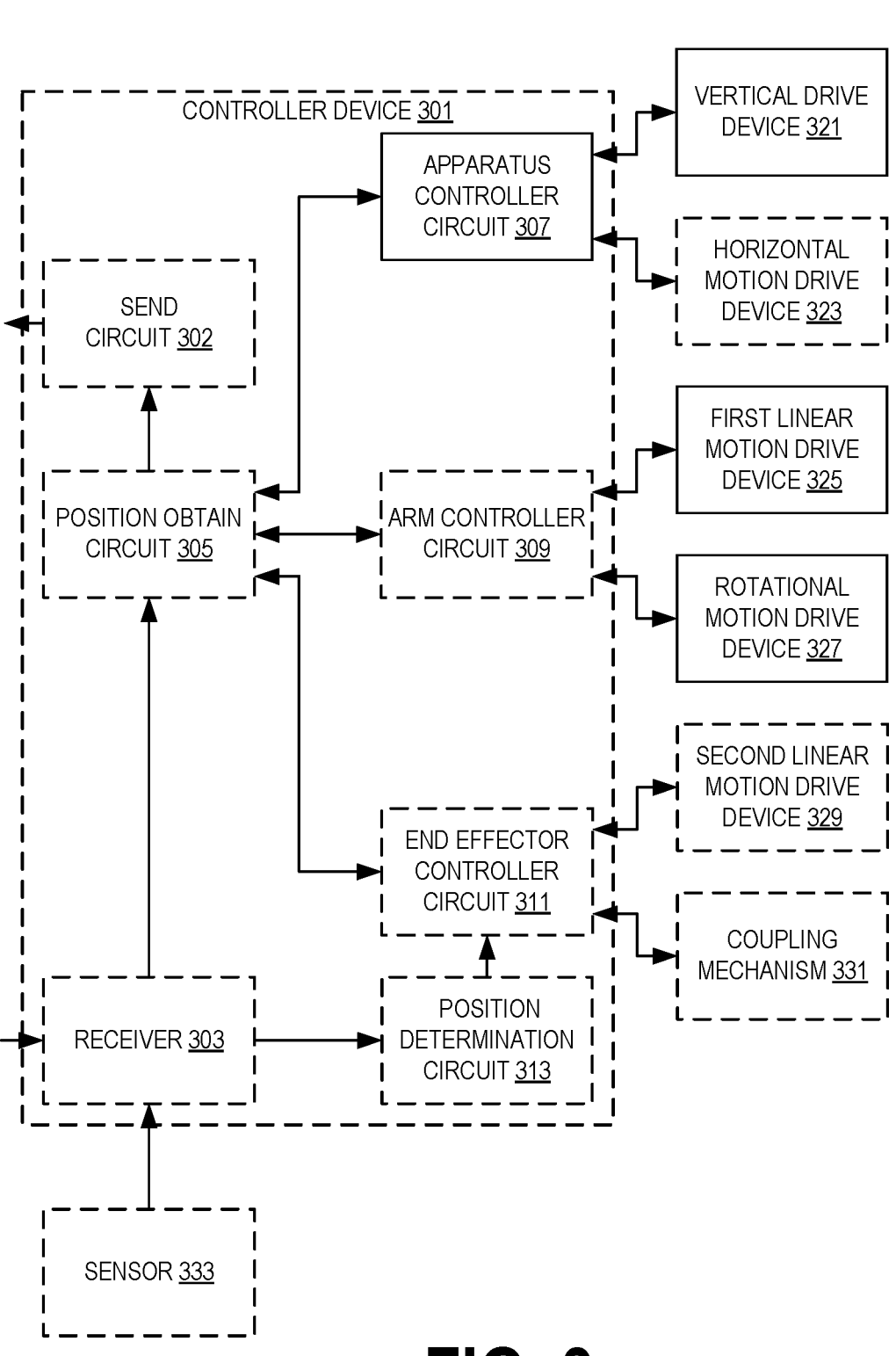
FIG. 3 illustrates another embodiment of a multidirectional robotic shelf restocking system in accordance with various aspects as described herein.

FIG. 3 illustrates another embodiment of a multidirectional robotic shelf restocking apparatus 300 in accordance with various aspects as described herein. In FIG. 3, the apparatus 300 includes a controller device 301 operable to implement various functional means, units, or modules (e.g., via the processing circuitry 201 in FIG. 2, via the processing circuitry 501 in FIG. 5, via software code, or the like), or circuits. In one embodiment, these functional means, units, modules, or circuits (e.g., for implementing the method(s) described herein) may include for instance: a send circuit 302 operable to send information; a receiver circuit 303 operable to receive information such as from the sensor 333; a position obtain circuit 305 operable to obtain a certain position such as associated with a restock item or a stocked item; an apparatus controller circuit 307 operable to control a vertical motion drive device 321, a horizontal motion drive device 323, and a rotational motion drive device 327 so as to position the restocking apparatus 121, 200, 300, 500; an arm controller circuit 309 operable to control a first linear motion drive device 325 to position an end effector; an end effector controller circuit 311 operable to control a second linear motion drive device 329 to position a coupling mechanism 331; and a position determination circuit 313 operable to determine a position for the end effector or the coupling mechanism.

FIGS. 4A-C illustrate embodiments of a method 400a-c performed by a multidirectional robotic shelf restocking apparatus 121, 200, 300, 500 of shelf restocking in accordance with various aspects as described herein. In FIG. 4A, the method 400a may start, for instance, at block 401a where it can include obtaining the first position of an item to restock associated with the first region (e.g., restocking floor). At block 403a, the method 400a includes controlling the vertical motion drive, the horizontal motion drive, or the rotational motion drive to move the restocking apparatus 121, 200, 300, 500 adjacent the first position. While the restocking apparatus 121, 200, 300, 500 is adjacent the first position, the method 400a may include controlling the first linear motion drive to linearly extend the end effector adjacent the first position, as represented by block 405a. While the end effector is adjacent the first position, the method 400a may include controlling the second linear motion drive and the coupling mechanism to releasably secure and transfer the item from the first position onto the support surface, as represented by block 407a. At block 409a, the method 400a can include obtaining the second position associated with a stocked item in the second region (e.g., retail floor). At block 411, the method 400a may include controlling the vertical, horizontal or rotational motion drive to transfer the item from the first position to adjacent the second position. While the restocking apparatus 121, 200, 300, 500 is adjacent the second position, the method 400a may include controlling the first linear motion drive to linearly extend the end effector adjacent the second position, as represented by block 413a. While the end effector is adjacent the second position, the method 400a may include controlling the second linear motion drive and the coupling mechanism to releasably secure and transfer the item from the support surface to the second position, as represented by block 415a.

In FIG. 4B, the method 400b may start, for instance, at block 401b where it may include determining to obtain a measured distance between the end effector and the item to restock at or about the first position responsive to determining that the end effector is adjacent the first position. At block 403b, the method 400b may include receiving, from the sensor (e.g., laser sensor) of the end effector, an indication that includes a measurement of a distance between the end effector and the item at the first position. At block 405b, the method 400b may include determining/verifying/updating the first position of the item to restock based on the measured distance. While the end effector is adjacent the first position, the method 400b includes controlling the second linear motion drive and the coupling mechanism to releasably secure and transfer the item from the first position onto the support surface, as represented by block 407b.

In FIG. 4C, the method 400c may start, for instance, at block 401c where it may include determining to obtain a measured distance between the end effector and a last item of the set of the same stocked item linearly arranged on the shelf along the first longitudinal axis that is associated with the second position responsive to determining that the end effector is adjacent the second position. At block 403c, the method 400c may include receiving, from the sensor, an indication that includes a distance measurement between the end effector and the last item. At block 405c, the method 400c may include determining/verifying/updating the second position of the item to restock based on the measured distance. While the end effector is adjacent the second position, the method 400c includes controlling the second linear motion drive and the coupling mechanism to releasably secure and transfer the item from the support surface to the second position, as represented by block 407c.

Figure 5:
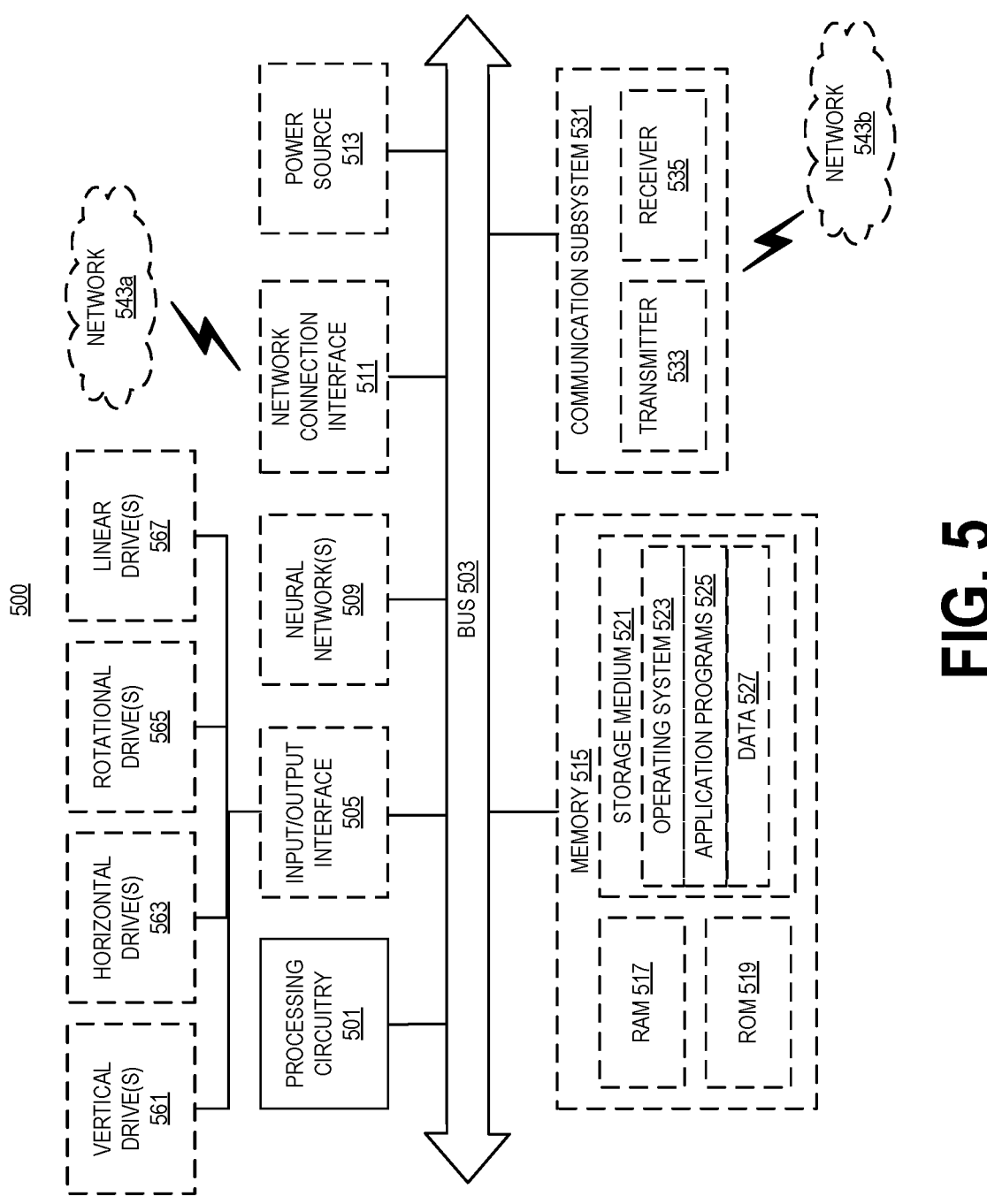
FIG. 5 illustrates another embodiment of a controller device of a multidirectional robotic shelf restocking system in accordance with various aspects as described herein.

FIG. 5 illustrates another embodiment of a controller device 500 in accordance with various aspects as described herein. In FIG. 5, device 500 includes processing circuitry 501 that is operatively coupled to input/output interface 505, neural network circuit 509, network connection interface 511, memory 515 including random access memory (RAM) 517, read-only memory (ROM) 519, and storage medium 521 or the like, communication subsystem 531, power source 533, and/or any other component, or any combination thereof.

The input/output interface 505 may be configured to provide a communication interface to an input device, output device, or input and output device. The device 500 may be configured to use an output device 561 via input/output interface 505. An output device 561 may use the same type of interface port as an input device. For example, a USB port may be used to provide input to and output from the device 500. In another example, the input/output interface 505 may be communicatively interfaced to one or more vertical motion drive devices 561, one or more horizontal motion drive devices 563, one or more rotational motion drive devices 565, one or more linear motion drive devices 567, the like, or any combination thereof. The output device 561 may be a speaker, a sound card, a video card, a display, a monitor, a printer, an actuator, an emitter, a drive device, a smartcard, another output device, or any combination thereof. The device 500 may be configured to use an input device via input/output interface 505 to allow a user to capture information into the device 500. The input device may include a touch-sensitive or presence-sensitive display, an optical sensor 563, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection, classification, or identification of certain objects displayed in an image. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a multidirectional robotic shelf restocking apparatus configured to operate in first and second adjoining regions. The first region is above or below the second region defined by opposing stocked shelf structures having items to be restocked. Further, the first region is associated with items to restock those stocked shelf structures. The stocked shelf structures include multiple shelves at various horizontal levels. Each shelf includes sets of various items with each set of the same stocked item being linearly arranged on the shelf along a first longitudinal axis. The restocking apparatus includes a controller device, a vertical motion mechanism and corresponding vertical motion drive operable to move the vertical motion mechanism in a vertical direction, and an arm member and a corresponding rotational motion drive operable to rotate the arm member between the stocked shelf structures along a horizontal plane and a corresponding first linear motion drive operable to linearly extend and retract the arm member. The restocking apparatus further includes an end effector coupled to the arm member and configured to transfer an item from a first position associated with the first region to a second position associated with the second region by the motion of the vertical motion mechanism and the arm member. The method includes controlling, by the controller device, the vertical motion drive, the rotational motion drive, or the first linear motion drive to transfer an item from the first position to the second position so as to restock at least one of the sets of various items linearly arranged on the shelves of the stocked shelf structures.

In another exemplary embodiment, the method further includes obtaining, by the controller device, the first position of the item to be restocked based on a predetermined map of one or more items of the sets of various items to be restocked that are stored in the first region.

In another exemplary embodiment, the method further includes controlling, by the controller device, the vertical motion drive, the rotational motion drive, and the linear motion drive to move the restocking apparatus horizontally adjacent the first position. In addition, the method further includes controlling, by the controller device, while the restocking apparatus is horizontally adjacent the first position, the first linear motion drive to linearly extend the arm so as to position the end effector adjacent the first position.

In another exemplary embodiment, the method further includes controlling, by the controller device, while the end effector is adjacent the first position, a second linear motion drive and a coupling mechanism to releasably secure and transfer the item from the first position onto a support surface, wherein the end effector includes the second linear motion drive operable to extend and retract the end effector, the coupling mechanism operable to releasably secure an item and the support surface operable to support an item during the transfer between the first and second positions.

In another exemplary embodiment, the method further includes obtaining, by the controller device, the second position of the item to be restocked based on a predetermined map of the sets of various items stored on the shelves of the opposing stocked shelf structures.

In another exemplary embodiment, the method further includes controlling, by the controller device, the vertical motion drive, the rotational motion drive, and the linear motion drive to move the restocking apparatus horizontally adjacent the second position. In addition, the method further includes controlling, by the controller device, while the restocking apparatus is horizontally adjacent the second position, the first linear motion drive to linearly extend the arm so as to position the end effector adjacent the second position.

In another exemplary embodiment, the method further includes controlling, by the controller device, while the end effector is adjacent the second position, a second linear motion drive and a coupling mechanism to releasably secure and transfer the item from a support surface to the second position. Further, the end effector includes the second linear motion drive operable to extend and retract the coupling mechanism, the coupling mechanism operable to releasably secure the item, and the support surface operable to support the item during the transfer between the first and second positions.

In another exemplary embodiment, the method further includes determining to obtain a measured distance between the end effector and a last item of the set of the same stocked item linearly arranged on the shelf along the first longitudinal axis that is associated with the second position responsive to determining that the end effector is adjacent the second position. The method further includes receiving, from a sensor of the end effector, an indication that includes a measurement of a distance between the end effector and the last item, with the sensor being operable to sense a distance between the end effector and an obstacle. The method further includes verifying or updating the second position of the item to restock based on the measured distance to the last item. In addition, the method further includes controlling, by the controller device, while the end effector is adjacent the second position, the linear motion drive and the coupling mechanism to releasably secure and transfer the item from a support surface of the end effector to the second position, with the support surface being configured to support an item during transfer between the first and second positions.

In another exemplary embodiment, the rotational motion drive is operable to rotate between two opposing positions on the stocked shelf structures that are separated by one hundred and eighty degrees on the horizontal plane.

In another exemplary embodiment, the first region is further associated with a first surface with the opposing stocked shelf structures positioned on the first surface and the second region is further associated with a second surface that is positioned above or below the first surface. Further, an aperture is disposed in a portion of the first surface that adjoins the first and second regions. The aperture is configured to enable the restocking apparatus to move between the first and second regions.

In one exemplary embodiment, a multidirectional robotic shelf restocking apparatus is configured to operate in first and second adjoining regions. The first region is positioned above or below the second region defined by opposing stocked shelf structures having items to be restocked. Further, the first region is associated with items to restock those stocked shelf structures. The stocked shelf structures have multiple shelves at various horizontal levels with each shelf having sets of various items with each set of the same stocked item being linearly arranged on the shelf along a first longitudinal axis. The restocking apparatus includes a controller device, a vertical motion mechanism and corresponding vertical motion drive operable to move the vertical motion mechanism in a vertical direction, and an arm member and a corresponding rotational motion drive operable to rotate the arm member between the stocked shelf structures along a horizontal plane and a corresponding first linear motion drive operable to linearly extend and retract the arm member. The restocking apparatus also includes an end effector coupled to the arm member and configured to transfer an item from a first position associated with the first region to a second position associated with the second region by the motion of the vertical motion mechanism and the arm member. The controller device includes processing circuitry and memory, with the memory containing instructions executable by the processing circuitry whereby the processing circuitry is configured to control the vertical motion drive, the rotational motion drive, or the first linear motion drive to transfer an item from the first position to the second position so as to restock at least one of the sets of various items linearly arranged on the shelves of the stocked shelf structures.

In another exemplary embodiment, the restocking apparatus further includes a horizontal motion mechanism and corresponding horizontal motion drive operable to move the horizontal motion mechanism horizontally along a second longitudinal axis that is perpendicular to the first longitudinal axis. The end effector is further configured to transfer the item from the first position to the second position by the motion of the horizontal motion mechanism. In addition, the memory contains instructions executable by the processing circuitry whereby the processing circuitry is further configured to control the horizontal motion drive to transfer the item from the first position to the second position.

In another exemplary embodiment, the memory contains instructions executable by the processing circuitry whereby the processing circuitry is further configured to: obtain the first position associated with an item to restock; control the vertical motion drive, the rotational motion drive, or the first linear motion drive to move the end effector to the first position so as to releasably secure the item at the first position; and control the vertical motion drive, the rotational motion drive, or the first linear motion drive to move the end effector to the second position so as to restock the item on the shelf.

In another exemplary embodiment, the end effector includes a sensor that is operable to sense a distance between the end effector and an object. Further, the memory contains instructions executable by the processing circuitry whereby the processing circuitry is further configured to: receive, from the sensor, an indication that includes a measurement of a distance between the end effector and the item positioned at the first position; and control the vertical motion drive, the rotational motion drive, or the first linear motion drive to move the end effector to the first position based on the distance measurement.

In another exemplary embodiment, the end effector includes a sensor that is operable to measure a distance between the end effector and an item positioned on a shelf of either stocked shelf structure. Further, the memory contains instructions executable by the processing circuitry whereby the processing circuitry is further configured to: receive, from the sensor, an indication that includes a measurement of a distance between the end effector and a last item of the set of the same stocked item linearly arranged on the shelf along the first longitudinal axis; and control the vertical motion drive, the rotational motion drive, or the linear motion drive to move the end effector to the second position that corresponds to an empty position adjacent the last item along the first longitudinal axis based on the distance measurement.

In another exemplary embodiment, the rotational motion drive is operable to rotate between two opposing positions on the stocked shelf structures that are separated by one hundred and eighty degrees on the horizontal plane.

In another exemplary embodiment, the end effector includes a coupling device operable to releasably secure an item.

In another exemplary embodiment, the end effector includes a second linear motion mechanism coupled to the coupling device and a corresponding second linear motion drive operable to extend and retract the coupling device.

In another exemplary embodiment, the end effector includes a surface configured to support an item during the transfer of the item from the first position to the second position. In addition, the memory contains instructions executable by the processing circuitry whereby the processing circuitry is further configured to: control, while adjacent the first position, the second linear motion drive and the coupling mechanism to releasably secure and transfer the item onto the support surface; and control, while adjacent the second position, the second linear motion drive and the coupling mechanism to releasably secure and transfer the item from the support surface to the second position on the shelf.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

operating a multidirectional robotic shelf restocking apparatus configured to operate in first and second adjoining regions, with the first region being above or below the second region defined by opposing stocked shelf structures having sets of stocked items and the first region being associated with items to restock at least one of the sets of stocked items, with each stocked shelf structure having multiple shelves at various horizontal levels, with each shelf having one or more of the sets of stocked items, each set having the same stocked item linearly arranged on the shelf along a first longitudinal axis, the restocking apparatus having a controller device, a vertical motion mechanism and corresponding vertical motion drive operable to move the vertical motion mechanism in a vertical direction, an arm member and both a corresponding rotational motion drive operable to rotate the arm member between the stocked shelf structures and a corresponding first linear motion drive operable to linearly extend and retract the arm member, and an end effector coupled to the arm member and configured to transfer an item to restock from a first position associated with the first region to a second position associated with the second region by the motion of the vertical motion mechanism and the arm member, the end effector includes a coupling mechanism operable to releasably secure an item and a second linear motion mechanism coupled to the coupling mechanism and a corresponding second linear motion drive operable to extend and retract the coupling mechanism, controlling, by the controller device, the vertical motion drive, the rotational motion drive, or the first linear motion drive to transfer an item from the first position associated with the first region to the second position associated with the second region so as to restock the at least one of the sets of stocked items linearly arranged on the shelves of the stocked shelf structures.

2. The method of claim 1, further comprising:

obtaining, by the controller device, the first position of the item to restock based on a predetermined map of the items to restock positioned in the first region.

3. The method of claim 1, further comprising:

controlling, by the controller device, the vertical motion drive, the rotational motion drive, and the first linear motion drive to move the restocking apparatus horizontally adjacent the first position; and controlling, by the controller device, while the restocking apparatus is horizontally adjacent the first position, the first linear motion drive to linearly extend the arm member so as to position the end effector adjacent the first position.

4. The method of claim 1, further comprising:

controlling, by the controller device, while the end effector is adjacent the first position, the second linear motion drive and the coupling mechanism to releasably secure and transfer the item from the first position onto a support surface, wherein the end effector includes the second linear motion drive operable to extend and retract the coupling mechanism, the coupling mechanism operable to releasably secure an item and the support surface operable to support an item during the transfer between the first and second positions.

5. The method of claim 1, further comprising:

obtaining, by the controller device, the second position specific to a corresponding set having the same stocked item based on a predetermined map of the sets of stocked items positioned on the shelves of the opposing stocked shelf structures.

6. The method of claim 1, further comprising:

controlling, by the controller device, the vertical motion drive, the rotational motion drive, and the first linear motion drive to move the restocking apparatus horizontally adjacent the second position; and controlling, by the controller device, while the restocking apparatus is horizontally adjacent the second position, the first linear motion drive to linearly extend the arm member so as to position the end effector adjacent the second position.

7. The method of claim 1, further comprising:

controlling, by the controller device, while the end effector is adjacent the second position, the second linear motion drive and the coupling mechanism to releasably secure and transfer the item from a support surface to the second position, wherein the end effector includes the second linear motion drive operable to extend and retract the coupling mechanism, the coupling mechanism being operable to releasably secure the item, and the support surface being operable to support the item during the transfer between the first and second positions.

8. The method of claim 7, further comprising:

determining to obtain a measured distance between the end effector and a last stocked item of a corresponding set having the same stocked item linearly arranged on the shelf along the first longitudinal axis responsive to determining that the end effector is adjacent the second position;

receiving, from a sensor of the end effector, an indication that includes a measurement of a distance between the end effector and the last stocked item, with the sensor being operable to sense a distance between the end effector and an obstacle;

verifying or updating the second position of the item to restock based on the measured distance to the last stocked item; and controlling, by the controller device, while the end effector is adjacent the second position, the second linear motion drive and the coupling mechanism to releasably secure and transfer the item from a support surface of the end effector to the second position, with the support surface being configured to support an item during transfer between the first and second positions.

9. The method of claim 1, wherein the rotational motion drive is operable to rotate one hundred and eighty degrees on a horizontal plane between the stocked shelf structures.

10. The method of claim 1, wherein the first region is further associated with a first surface having the opposing stocked shelf structures positioned on the first surface and the second region is further associated with a second surface that is positioned above or below the first surface, with an aperture disposed in a portion of the first or second surface that adjoins the first and second regions, with the aperture being configured to enable the restocking apparatus to move between the first and second regions.

11. A multidirectional robotic shelf restocking apparatus, comprising:

with the restocking apparatus being configured to operate in first and second adjoining regions, with the first region being above or below the second region defined by opposing stocked shelf structures having sets of stocked items and the first region being associated with items to restock at least one of the sets of stocked items, with each stocked shelf structure having multiple shelves at various horizontal levels, with each shelf having one or more of the sets of stocked items with each set having the same stocked item linearly arranged on the shelf along a first longitudinal axis, the restocking apparatus having a controller device, a vertical motion mechanism and corresponding vertical motion drive operable to move the vertical motion mechanism in a vertical direction, an arm member and a corresponding rotational motion drive operable to rotate the arm member between the stocked shelf structures and a corresponding first linear motion drive operable to linearly extend and retract the arm member, and an end effector coupled to the arm member and configured to transfer an item to restock from a first position associated with the first region to a second position associated with the second region by the motion of the vertical motion mechanism and the arm member, the end effector including a coupling mechanism operable to releasably secure an item and a second linear motion mechanism coupled to the coupling mechanism and a corresponding second linear motion drive operable to extend and retract the coupling mechanism; and wherein the controller device includes processing circuitry and memory, with the memory containing instructions executable by the processing circuitry whereby the processing circuitry is configured to:

control the vertical motion drive, the rotational motion drive, or the first linear motion drive to transfer an item from the first position associated with the first region to the second position associated with the second region so as to restock at least one of the sets of stocked items linearly arranged on the shelves of the stocked shelf structures.

12. The apparatus of claim 11, further comprising:

a horizontal motion mechanism and corresponding horizontal motion drive operable to move the horizontal motion mechanism horizontally along a second longitudinal axis that is perpendicular to the first longitudinal axis;

wherein the end effector is further configured to transfer the item from the first position to the second position by the motion of the horizontal motion mechanism; and wherein the memory contains instructions executable by the processing circuitry whereby the processing circuitry is further configured to:

control the horizontal motion drive to transfer the item from the first position to the second position.

13. The apparatus of claim 11, wherein the memory contains instructions executable by the processing circuitry whereby the processing circuitry is further configured to:

obtain the first position associated with an item to restock;

control the vertical motion drive, the rotational motion drive, or the first linear motion drive to move the end effector to the first position so as to releasably secure the item at the first position; and control the vertical motion drive, the rotational motion drive, or the first linear motion drive to move the end effector to the second position so as to restock the item on the shelf.

14. The apparatus of claim 13, wherein the end effector includes a sensor that is operable to sense a distance between the end effector and an object; and wherein the memory contains instructions executable by the processing circuitry whereby the processing circuitry is further configured to:

receive, from the sensor, an indication that includes a measurement of a distance between the end effector and the item positioned at the first position; and control the vertical motion drive, the rotational motion drive, or the first linear motion drive to move the end effector to the first position based on the distance measurement.

15. The apparatus of claim 13, wherein the end effector includes a sensor that is operable to measure a distance between the end effector and an item positioned on a shelf of either stocked shelf structure; and wherein the memory contains instructions executable by the processing circuitry whereby the processing circuitry is further configured to:

receive, from the sensor, an indication that includes a measurement of a distance between the end effector and a last stocked item of a corresponding set having the same stocked item linearly arranged on the shelf along the first longitudinal axis;

determine the second position that corresponds to a position adjacent to the last stocked item based on the measured distance; and control the first linear motion drive to move the end effector to the second position.

16. The apparatus of claim 11, wherein the rotational motion drive is operable to rotate between two opposing positions on the stocked shelf structures that are separated by one hundred and eighty degrees on the horizontal plane.

17. The apparatus of claim 11, wherein the end effector includes a surface configured to support an item during the transfer of the item from the first position to the second position;

wherein the memory contains instructions executable by the processing circuitry whereby the processing circuitry is further configured to:

control, while adjacent the first position, the second linear motion drive and the coupling mechanism to releasably secure and transfer the item onto the support surface; and control, while adjacent the second position, the second linear motion drive and the coupling mechanism to releasably secure and transfer the item from the support surface to the second position on the shelf.

18. The apparatus of claim 11, wherein the first region is further associated with a first surface with the opposing stocked shelf structures positioned on the first surface and the second region is further associated with a second surface that is positioned above or below the first surface, with an aperture disposed in the first surface adjoining the first and second regions, the aperture being configured to enable the restocking apparatus to move between the first and second regions.

\* \* \* \* \*